(12) United States Patent
Vo et al.

(10) Patent No.: US 6,579,911 B1
(45) Date of Patent: Jun. 17, 2003

(54) FIRE RESISTANT STYRENE POLYMER FOAMS WITH REDUCED BROMINATED FIRE RETARDANT

(75) Inventors: Chau Van Vo, Souffelweyersheim (FR); Sylvie Boukami, Schweighouse (FR)

(73) Assignee: The Dow Chemical Company, Midland, MI (US)

(*) Notice: Subject to any disclaimer, the term of this patent is extended or adjusted under 35 U.S.C. 154(b) by 0 days.

(21) Appl. No.: 09/744,005

(22) PCT Filed: Aug. 26, 1999

(86) PCT No.: PCT/US99/19408
§ 371 (c)(1),
(2), (4) Date: Jun. 4, 2001

(87) PCT Pub. No.: WO00/12593
PCT Pub. Date: Mar. 9, 2000

Related U.S. Application Data

(60) Provisional application No. 60/098,216, filed on Aug. 28, 1998.

(51) Int. Cl.$^7$ .................................................. C08J 9/00
(52) U.S. Cl. ............................. 521/85; 521/79; 521/96; 521/98
(58) Field of Search ............................. 521/85, 98, 96, 521/79

(56) References Cited

U.S. PATENT DOCUMENTS

| | | | |
|---|---|---|---|
| 3,420,786 A | 1/1969 | Weber et al. | 260/2.5 |
| 4,281,067 A | 7/1981 | Kienzel et al. | 521/56 |
| 5,171,757 A | * 12/1992 | Stobby et al. | |

FOREIGN PATENT DOCUMENTS

| | | | |
|---|---|---|---|
| AT | 316879 | 7/1974 | |
| CZ | 201748 | 3/1980 | ........... C08L/51/04 |
| DE | 1244396 | 7/1967 | |
| DE | 130482 | 4/1978 | ........... C08F/2/18 |
| DE | 42 40 109 A1 | 6/1994 | |
| DE | 19632439 A1 | 2/1998 | |
| EP | 732357 A1 | 9/1996 | ........... C08J/9/224 |
| EP | 814119 A1 | 12/1997 | ........... C08K/3/00 |
| GB | 1182964 | 4/1970 | ........... C08F/47/10 |
| JP | 57-12048 | 1/1982 | |
| JP | 1-247434 | 10/1989 | ........... C08J/9/14 |
| JP | 2-77435 | 3/1990 | ........... C08J/9/14 |
| JP | 4-168130 | 6/1992 | ........... C08J/9/14 |
| JP | 4-189526 | 7/1992 | ........... B29C/47/00 |
| JP | 4-307228 | 10/1992 | ........... B29C/67/22 |
| JP | 6-157802 | 6/1994 | ........... C08J/9/16 |
| JP | 6-329824 | 11/1994 | ........... C08J/9/14 |
| WO | WO 93/12163 | 6/1993 | ........... C08J/9/00 |

OTHER PUBLICATIONS

Flame Retardancy of Polymeric Materials vol. 1, William C. Kuryla and A. J. Papa, Marcell Dekker, Inc, New York, 1973, pp. 133–137.

* cited by examiner

Primary Examiner—Morton Foelak

(57) ABSTRACT

Extruded, substantially closed-polystyrene foams that exhibit improved fire resistance yet contain lower levels of brominated fire retardant are disclosed. Methods of preparing the foams, comprising extruding the polystyrene with a novel fire retardant formulation comprising a mixture of a) a phosphate compound, preferably TPP; b) less than about 2.5 percent HBCD based on 100 percent polystyrene; and optionally c) a flow promoter such as dimethyldiphenylbutane, the extrusion process using a blowing agent which is preferably selected from carbon dioxide, mixtures of two or more of carbon dioxide, water, alcohol, ether and hydrocarbons, or a mixture of hydrofluorocarbons, alcohols, and hydrocarbons, are also disclosed. Use of the phosphate compound in the fire retardant formulation allows a reduction in the amount of brominated compound required and a reduction in the foaming temperature, resulting in lower density foams.

20 Claims, No Drawings

FIRE RESISTANT STYRENE POLYMER FOAMS WITH REDUCED BROMINATED FIRE RETARDANT

This application claims the benefit of provisional application Ser. No. 60/098,216, filed Aug. 28, 1998.

The present invention relates to fire retardant or fire resistant styrene polymer foams and in particular, relates to fire resistant or fire retardant styrene polymer foams having reduced brominated fire retardant.

Over the past several decades, polymer foams have become available in a wide variety of forms, either in answer to a material need in industry, or as a developmental expansion of commercialized precursors. Some of the more popular forms of foamed polymer. compositions take the shape of films, sheets, slabs and profiles. Generally, these products are produced by extrusion methods in which the polymer is converted by heat and pressure into a homogeneous melt and forced through a die into the desired shape. To obtain a cellular structure, the plastic usually incorporates a blowing agent that decomposes under the heat of the extrusion process and releases gases that cause the shape to expand. It is also possible to inject propellants directly into the melt.

Because of the favorable combination of properties, price and ease of processing, styrene polymers, especially polystyrene, are widely used in preparing foam sheets, films and slabs for such divergent end uses as packaging, pipe and tubing, construction and insulation. For example, expanded styrene polymers such as polystyrene are widely used in the insulation of freezers, coolers, truck bodies, railroad cars, farm buildings, roof decks and residential housing. Styrene polymer foams are also used as the core material for structural sandwich panels used in refrigerated truck bodies, mobile homes and recreational vehicles.

There is an increasing demand for improving the fire retardant properties of materials used in vehicles, the building trades and consumer goods, such as furniture, radio and television cabinets, appliance housing, electrical motor housings, and switch boxes. To meet this demand, various steps have been taken to improve the fire retardant properties of thermoplastic polymers in order to make them slower to ignite and to retard flame propagation. Thermoplastic polymers can be rendered flame retardant by compounding with fire retardant additives, including halogenated organic compounds and inorganic compounds such as antimony oxide.

Brominated organic compounds have been used in both foamed and nonfoamed styrene polymer compositions, with most ignition-resistant styrene polymer foam products being made with a brominated fire retardant, optionally including a radical generator synergist or flow promoter. Of the various brominated organic compounds, typically only brominated aliphatics are utilized with vinylaromatic foams, with hexabromocyclododecane (HBCD) being the most common.

While effective in improving flame retardancy, the incorporation of flame retardant additives into thermoplastic polymer compositions can negatively impact the strength of the foam, particularly at higher levels of such additives. In non-foamed polymers, the bromine content is typically quite high, for example, in excess of 5 parts of bromine per 100 parts of styrene polymer. However, in foamed styrene polymers, the degree of bromine loading has to be significantly lower to avoid detrimentally impacting the structural qualities and skin quality of the foam.

For example, when utilizing HBCD as a fire retardant in a styrene polymer foam, a high level of HBCD is required in order to meet fire retardancy requirements, particularly the stringent European fire retardancy tests. Depending on the foam characteristics (for example, density, blowing agents, etc.), the amount of HBCD typically required to meet fire retardancy requirements is from 2.5 percent to 4 percent by weight of the styrene polymer (the higher the foam density, the higher the percentage of HBCD). However, the incorporation of HBCD into the styrene polymer foam at these levels may result in 1) a poor dispersion of the HBCD in the foam, resulting in non-uniform expansion and poor skin quality and 2) a high degree of degradation of the styrene polymer and of the regrinded material in the extrusion process due to excessive heating, resulting in reduction of the molecular weight of the styrene polymer foam and of the regrinded styrene polymer and a resultant drop in physical properties.

Therefore, there remains a need in the art for fire-retardant styrene polymer foams which utilize hexabromocyclododecane (HBCD) as the fire retardant, which meet fire retardancy requirements, and which are amenable to extrusion processes, but which do not exhibit poor structural qualities and/or skin qualities.

Those needs are met by the present invention. Thus, the present invention provides extruded, flame retardant, foamed styrene polymer compositions which utilize hexabromocyclododecane (HBCD) as the fire retardant, which meet fire retardancy requirements, and which are amenable to extrusion processes, but which do not exhibit poor structural qualities and/or skin qualities. The extruded, flame-retardant, foamed styrene polymer compositions of the present invention utilize a fire retardant formulation which is comprised of a mixture of hexabromocyclododecane (HBCD) and a phosphorous compound. The use of the phosphorous compound in the fire retardant formulation allows the use of less than about 2.5 percent of HBCD while maintaining a high level of fire resistance. Because a lower level of HBCD is utilized, the foams of the present invention do not suffer from poor structural qualities and/or skin qualities. Furthermore, the use of such a fire retardant composition allows a production of polystyrene foam with lower foam density, thus effecting appreciable cost savings.

Thus, in one embodiment of the present invention, there is provided a polymer foam composition comprising: a) a styrene polymer; and b) a fire retardant formulation comprising: 1) less than about 2.5 percent by weight, based on 100 percent of styrene polymer, of HBCD; and 2) from 0.1 percent to 4.0 percent by weight, based on 100 percent of styrene polymer, of a phosphorous compound.

In another embodiment, there is provided a polymer foam composition comprising: a) a styrene polymer; and b) a fire retardant formulation comprising: 1) less than about 2.5 percent by weight, based on 100 percent of styrene polymer, of HBCD; and 2) from 0.1 percent to 4.0 percent by weight, based on 100 percent of styrene polymer, of a phosphorous compound; and c) 0.01 percent to 0.2 percent by weight based on 100 percent of styrene polymer, of a flow promoter.

The present invention provides an extruded, fire-retardant, styrene polymer foam in which the fire retardant formulation is comprised of a mixture of HBCD and a phosphorous compound. The use of the phosphorous compound in the fire retardant formulation allows the use of less than about 2.5 percent of HBCD while maintaining a high level fire resistance. Because a lower level of HBCD is utilized, the HBCD is well dispersed in the foam and the foam is uniformly expanded with good skin quality. In addition, the presence of the phosphorous compound results in a lower density foam. A foam with lower density is formed even though the foaming temperature is lowered to account for the lowering of the glass transition temperature of the styrene polymer (due to the higher solubility of the phosphate compound in the styrene polymer).

The flame retardant foamed polymer compositions of the present invention comprise: a) a styrene polymer; b) a fire retardant formulation comprising HBCD and a phosphorous compound; and optionally, c) a flow promoter.

Suitable styrene polymers for use in the present invention include polystyrene or a copolymer formed from styrene monomer and copolymerizable ethylenically unsaturated co-monomers. The co-monomer content is typically less than about 50 percent, and preferably less than about 20 percent based upon the weight of the styrene polymer. Examples of copolymerized compounds include α-methylstyrene, acrylonitrile, acrylic or methacrylic acids having one to eight carbon atoms, esters of acrylic or methacrylic acid with alcohols having one to eight carbon atoms, fumaric esters having one to eight carbon atoms, maleic anhydride or a small amount of divinyl benzene.

The HBCD portion of the fire retardant formulation is present in the styrene polymer foam in an amount less than about 2.5 percent by weight based on 100 percent of the styrene polymer, with amounts less than 2.0 percent being preferred, amounts from 1.0 percent to 1.6 percent being more preferred, and an amount of 1.4 percent being especially preferred.

The phosphorous compound portion of the fire retardant formulation may be any organic compound which contains one or more phosphorous atoms and includes, but is not limited to, phosphates of the formula $(RO)_3PO$ wherein each R is independently selected from a substituted or unsubstituted, saturated or unsaturated, branched or straight-chain aliphatic moiety or a substituted or unsubstituted aromatic moiety. Suitable phosphates include, but are not limited to, triphenylphosphate (TPP), tributylphosphate, triethylphosphate, trimethylphosphate, tripropylphosphate, trioctylphosphate, diphenyl cresylphosphate, diphenyl methylphosphate, tris-(2-ethylhexyl)phosphate, isodecyl diphenylphosphate, isooctyl diphenylphosphate, bisphenyl diphenylphosphate, trixylil phosphate, and triisopropylphenylphosphate. Other phosphorous compounds suitable for use in the present invention are phosphites of the formula $(RO)_3P$, phosphonates of the formula $(RO)_2RPO$, phosphinates of the formula $(RO)R_2PO$, phosphine oxides of the formula $R_3PO$, phosphines of the formula $R_3P$, and phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion, such as chloride or bromide. Of the above-described phosphorous compounds, phosphates are preferred and TPP is especially preferred.

The phosphorous compound is present in the styrene polymer foam in an amount from 0.1 percent to 4.0 percent by weight based on 100 percent of the styrene polymer, with 0.5 percent to 2.0 percent being preferred, with 1.0 percent to 2.0 percent being more preferred.

The polystyrene fire retardant formulations of the present invention may optionally include a flow promoter (melt flow modifiers) to assist initiation of the decomposition of the HBCD. By providing a source of reactive radicals (generated at a lower temperature than HBCD) which will abstract protons off the aliphatic portion(s) of HBCD and subsequently release the bromine radical, flow promoters are able to assist in the degradation of the HBCD. In addition, the reactive radicals from the flow promoter are capable of breaking down the styrene polymer chain during a fire, hence allowing the foam to melt away from the fire source. Suitable flow promoters include 2,3-dimethyl-2,3-diphenylbutane (that is, dicumyl or DMDPB); dicumyl peroxide, α,α'-bis-tert-butylperoxydiisopropylbenzene; bis (α-phenylethyl)sulfone; 1,1'-diphenylbicyclohexyl; 2,2'-dimethyl-2,2'-azobutane; 2,2'-dichloro-2,2'-azobutane; 2,2'-dibromo-2,2'-azobutane; 2,2'-dimethyl-2,2'-azobutane-3,3', 4,4'-tetracarboxylic acid; 1,1'-diphenylbicyclopentyl; 2,5-bis(tribromomethyl)-1,3-4-thiadiazole; 2-(bromophenyl-5-tribromophenyl)-2,3,4-thiadiazole; dioctyl tin maleate; and dibutyl tin maleate. The most preferred flow promoter for use in the present invention is dimethyldiphenylbutane (that is, dicumyl or DMDPB).

Typically, when utilized, the flow promoter is present in the styrene polymer foam in an amount from 0.01 percent to 0.2 percent by weight based on 100 percent of the styrene polymer, with from 0.02 percent to 0.1 percent being preferred, and with 0.03 percent to 0.08 percent being especially preferred.

Various additives may also be incorporated in the present foam such as inorganic fillers; pigments, dyes, antioxidants, acid scavengers, ultraviolet absorbers, flame retardants, processing aids, dispersing agents, and extrusion aids.

Based upon the above, the following are typical flame retardant foamed polymer compositions of the present invention:

A polymer foam, comprising: a) a styrene polymer; and b) a fire retardant formulation comprising: 1) less than about 2.5 percent by weight, based on 100 percent of styrene polymer, preferably less than 2.0 percent, more preferably 1.0 to 1.6 percent, and most preferably 1.4 percent, of HBCD; and 2) from 0.1 percent to 4.0 percent by weight, based on 100 percent of styrene polymer, of a phosphorous compound;

a polymer foam, comprising: a) a styrene polymer; and b) a fire retardant formulation comprising: 1) less than about 2.5 percent by weight, based on 100 percent of styrene polymer, preferably less than 2.0 percent, more preferably 1.0 to 1.6 percent, and most preferably 1.4 percent, of HBCD; and 2) from 0.5 percent to 2.0 percent by weight, based on 100 percent of styrene polymer, of a phosphorous compound;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 1.0 percent to 2.0 percent by weight, based on 100 percent of styrene polymer, of a phosphorous compound;

a polymer foam, comprising: a) a styrene polymer; and b) a fire retardant formulation comprising: 1) less than about 2.5 percent by weight, based on 100 percent of styrene polymer, preferably less than 2.0 percent, more preferably 1.0 to 1.6 percent, and most preferably 1.4 percent, of HBCD; and 2) about 1.0 percent by weight, based on 100 percent of styrene polymer, of a phosphorous compound;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.1 percent to 4.0 percent by weight, based on 100 percent of styrene polymer, of a phosphorous compound; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.5 percent to 2.0 percent by weight, based on 100 percent of styrene polymer, of a phosphorous compound; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 1.0 percent to 2.0 percent by weight, based on 100 percent of styrene polymer, of a phosphorous compound; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight based on 100 percent of styrene polymer, preferably less than 2.0 percent, more preferably 1.0 to 1.6 percent, and most preferably 1.4 percent, of HBCD; and 2) 1.0 percent by weight, based on 100 percent of styrene polymer, of a phosphorous compound; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight based on 100 percent of styrene polymer, preferably less than 2.0 percent, more preferably 1.0 to 1.6 percent, and most preferably 1.4 percent, of HBCD; and 2) from 0.1 percent to 4.0 percent by weight, based on 100 percent of styrene polymer, of TPP;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.5 percent to 2.0 percent by weight, based on 100 percent of styrene polymer, of TPP;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 1.0 percent to 2.0 percent by weight, based on 100 percent of styrene polymer, of TPP;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) about 1.0 percent by weight, based on 100 percent of styrene polymer, of TPP;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.1 percent to 4.0 percent by weight, based on 100 percent of styrene polymer, of TPP; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight, based on 100 percent of styrene polymer, preferably less than 2.0 percent more preferably 1.0 to 1.6 percent, and most preferably 1.4 percent, of HBCD; and 2) from 0.5 percent to 2.0 percent by weight, based on 100 percent of styrene polymer, of TPP; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 1.0 percent to 2.0 percent by weight, based on 100 percent of styrene polymer, of TPP; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight based on 100 percent of styrene polymer, preferably less than 2.0 percent, more preferably 1.0 to 1.6 percent, and most preferably 1.4 percent, of HBCD; and 2) about 1.0 percent by weight, based on 100 percent of styrene polymer, of TPP; and c) 0.01 percent to 0.2 percent by weight, based on 100 percent of styrene polymer, of a flow promoter;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.1 percent to 4.0 percent by weight, based on 100 percent of styrene polymer, of TPP; and c) 0.01 percent to 0.2 percent by weight, based on 100 percent of styrene polymer of dimethyldiphenylbutane;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 0.5 percent to 2.0 percent by weight, based on 100 percent of styrene polymer, of TPP; and c) 0.01 percent to 0.2 percent by weight, based on 100 percent of styrene polymer of dimethyldiphenylbutane;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) from 1.0 percent to 2.0 percent by weight, based on 100 percent of styrene polymer, of TPP; and c) 0.01 percent to 0.2 percent by weight, based on 100 percent of styrene polymer, of dimethyldiphenylbutane;

a polymer foam, comprising: a) a styrene polymer; and b) a fire retardant formulation comprising: 1) less than 2.5 percent by weight, based on 100 percent of styrene polymer, preferably less than 2.0 percent, more preferably 1.0 to 1.6 percent, and most preferably 1.4 percent, of HBCD; and 2) about 1.0 percent by weight, based on 100 percent of styrene polymer, of TPP; and c) 0.01 percent to 0.2 percent by weight, based on 100 percent of styrene polymer, of dimethyldiphenylbutane.

The foams of the present invention may be prepared by extrusion processes well known to one of ordinary skill in the art.

A typical apparatus for making the foam according to an extrusion process is comprised of an extruder, a mixer, a cooler, and a die in series. Typically, the apparatus is maintained such that the feeding zone is maintained at 120° C. to 160° C.; the melting zone is maintained at 150° C. to 190° C., the metering zone is maintained at 180° C. to 220° C., and the mixing zone is maintained at 180° C. to 200° C. The fire retardant HBCD is in the form of a powder or as a granulate. Depending upon the physical state of the phosphorous compound (that is, liquid or solid), the phosphorous compound may be injected directly into the mixer, or introduced directly into the extruder. Alternatively, the phosphorous compound may be introduced in the form of a styrene polymer concentrate. The flow promoter, due to its required low concentration, is usually used in the form of a styrene polymer concentrate. All solid materials are fed to the extruder, while the liquid materials can be injected directly into the mixer. The fire retardant formulation and the other additives are mixed with the styrene polymer resin in the desired ratio. The blowing agent is then incorporated into the blended polymer melt at an elevated pressure in the mixer to form a foamable gel. The temperature of the foamable gel is reduced to a suitable foaming temperature (typically about 120° C.) by reducing the temperature of the cooling zone. The foamable gel is then conveyed through the die into a region of reduced pressure to form the foam, adjusting the die opening as required and expanding the foam between substantially parallel forming plates. The foam structure is preferably closed-cell, and has a closed-cell content of at least 90 percent according to ASTM D-2856. The foam structure preferably has a density of 16 kg/m³ to 80 kg/m³ according to ASTM D-1622. The foam further has an average cell size of 0.05 to 2.4 mm.

Suitable blowing agents for use in the present invention may be $CO_2$ or mixtures of blowing agents in any of the following proportions:

| | |
|---|---|
| $CO_2$: | from 0 percent to 100 percent of the blowing agent mixture; |
| Alcohol: | from 0 percent to 50 percent of the blowing agent mixture; |
| Water | from 0 percent to 50 percent of the blowing agent mixture; |
| Dimethyl ether | from 0 percent to 50 percent of the blowing agent mixture; |
| Hydrocarbon: | from 0 percent to 50 percent of the blowing agent mixture; |
| HFC-134a: | from 0 percent to 80 percent of the blowing agent mixture; |
| HFC-152a: | from 0 percent to 80 percent of the blowing agent mixture; and |
| HFC-134: | from 0 percent to 80 percent of the blowing agent mixture, | wherein HFC-134 is 1,1,2,2-tetrafluoroethane, HFC-134a is 1,1,1-2-tetrafluoroethane, and HFC-152a is 1,1-difluoroethane.

Preferred blowing agents are 100 percent $CO_2$, mixtures of $CO_2$, water, alcohol, dimethyl ether, and hydrocarbon, and mixtures of HFC-134a, HFC-134 and/or HFC-152a, alcohol, and hydrocarbon. The blowing agent is typically used at a concentration of between 0.05 to 0.20 mole/100 g polystyrene.

The following are examples of the present invention, and are not to be construed as limiting. Unless otherwise indicated, all percentages, parts, or proportions are by weight.

EXAMPLES 1 TO 3 AND COMPARATIVE EXAMPLES A THROUGH E

Closed-cell styrene polymer foams in accordance with the present invention are prepared utilizing a 5.08 cm (2 inch) diameter extruder which feeds a spline mixer, into which the blowing agents are injected. The spline mixer discharge is passed through heat exchangers. The discharge from the heat exchangers is passed through a static mixer and expanded through a slot die into a lower pressure region.

The styrene polymer is fed to the extruder with a fire retardant formulation comprising HBCD and optionally dimethyldiphenylbutane (dicumyl) from a dicumyl concentrate of 17 percent of dicumyl pure, and TPP is hot melt injected directly into the mixer, in accordance with the present invention, in amounts indicated in Table I. Blowing agents were injected into the mixer in amounts also indicated in Table I. The foamable gel was cooled down to approximately 120° C. and extruded through the die, and expanded between substantially parallel forming plates.

Table 1 shows the composition and foam properties of three foams of the present invention (Example 1 to 3) as well as five control foams (Comparative Examples A through E) for comparative purposes. The foams of Comparative Examples A to D was produced with only HBCD (HBCD) as the fire retardant. The amount of HBCD was increased from 1 to more than 2.7 percent of HBCD, in order to achieve a concentration of bromine ranging from 0.5 to 2 percent. All other additives remained unchanged. The foam of Comparative Example E was produced with a fire retardant composed of 5.5 percent of triphenyl phosphate and 0.068 percent dicumyl. The bromine percent in the foam is determined using the Oxford Lab X1005 x-ray Fluorescence analyzer. The foam is submitted to x-ray radiation from a radioactive Cadmium source and the x-rays correspond to the energy of the bromine element. By measuring the intensity of x-rays emitted, it is possible to quantify the bromine element in the sample. The bromine percent is obtained from an average of measurement of three foam specimens. The compressive strength is determined with the method ASTM 1621-79.

The German B2 test is performed according to the DIN-4102 Part 1. Five samples were tested. The lower the flame average height, the better the fire retardancy performance. The burning time should also be as low as possible. If the filter paper underneath the sample ignites within 20 seconds, the material is considered to burn with flaming droplet. The number reported in Table II is the number of burning papers during the test.

The French M1 test is performed according to NF-P 92-501/4/5 composed of two tests: flame persistency and

TABLE I

| Comp. Ex. or Ex. No. | Total Rate (kg/h) | HBCD (phr)[1] | Tpp (phr) | Dicumyl (phr) | $CO_2$ (phr) | Foaming Temperature (°C.) | Bromine (%) | Vertical Compressive Strength (kPa) | Thickness (mm) | Width (mm) | Density (kg/m³) | Vertical Cell Size (mm) |
|---|---|---|---|---|---|---|---|---|---|---|---|---|
| Comp. Ex. A | 70 | 0.7 | 0 | 0 | 4.7 | 124 | 0.5 | 426 | 43 | 148 | 38.3 | 0.33 |
| Comp. Ex. B | 70 | 1.4 | 0 | 0 | 4.7 | 124 | 1.1 | 394 | 48 | 143 | 38.8 | 0.33 |
| Comp. Ex. C | 70 | 2.1 | 0 | 0 | 4.7 | 124 | 1.5 | 410 | 48 | 158 | 38.1 | 0.33 |
| Comp. Ex. D | 75 | 2.7 | 0 | 0 | 4.7 | 121 | 2.2 | 384 | 44 | 143 | 38.9 | 0.34 |
| Comp. Ex. E | 75 | 0 | 5.5 | 0.068 | 4.7 | 114 | 0.0 | 291 | 29 | 156 | 6.2 | 0.33 |
| Ex. 1 | 75 | 1.4 | 2 | 0 | 4.7 | 119 | 0.9 | 373 | 34 | 139 | 36.3 | 0.33 |
| Ex. 2 | 75 | 1.4 | 2 | 0.068 | 4.7 | 116 | 0.9 | 289 | 32 | 152 | 36.0 | 0.29 |
| Ex. 3 | 75 | 1.4 | 1 | 0 | 4.7 | 119 | 0.9 | 225 | 29 | 157 | 36.2 | 0.32 |

[1]phr = parts per hundred parts of resin

Fire performance and fire retardancy performance are indicated in Table II, wherein the fire performance is measured according to the Limited Oxygen Index (LOI) and the fire retardancy performance is measured according to the German B2 test, French M1 test and Swiss Class V test.

The Limited Oxygen Index (LOI) is determined according to test method ASTM-D2863. This is the minimum concentration of oxygen, expressed as volume percent, in a mixture of oxygen and nitrogen that will just support flaming combustion of a material initially at room temperature under the conditions of this test method.

burning droplet. Three samples are tested. The average time for the flame to be self-extinguished should be as low as possible. The percentage of the number of burners with burning time above 2 percent as well as the number of the burning droplets should also be as small as possible.

The Swiss test is performed according to SIA 183/2.5. The lower the flame average height, the better the fire retardancy performance.

TABLE II

| Comp. Ex. or Ex. No. | Fire Performance Limited Oxygen Index (LOI) | German B2 Test | | | Swiss Test Flame Height (cm) | French M1 Test | | |
| | | Average Flame Height (cm) | Burning Time (sec) | Paper Ignition No. | | Flame persistency-mean (sec) | Flame persistency % > 2 sec | Burning drop number |
|---|---|---|---|---|---|---|---|---|
| Comp. Ex. A | 24.0 | 14.2 | 47 | 4 | 20 | 23.7 | 90 | 4 |
| Comp. Ex. B | 26.6 | 11 | 18.2 | 1 | 18 | 7.3 | 91 | 4 |
| Comp. Ex. C | 28.9 | 10 | 14.4 | 1 | 15 | 1.6 | 29 | 4 |
| Comp. Ex. D | 30.9 | 8.2 | 11.9 | 0.6 | 13 | 0.6 | 4 | 3 |
| Comp. Ex. E | 25.6 | 13.6 | 21.8 | 4 | 20 | 25.2 | 100 | 4 |
| Ex. 1 | 28.5 | 6.8 | 10.7 | 0.2 | 15 | 3.0 | 53 | 2 |
| Ex. 2 | 30.5 | 5.8 | 8.2 | 0 | 14 | 1.0 | 14 | 2 |
| Ex. 3 | 29.8 | 6.4 | 9.8 | | 15 | 1.0 | 11 | 4 |

As can be seen from Table I and Table II, the formulations according to the present invention exhibited a lower foam density than the foams of the Comparative Examples, although the formulations were produced at a lower foaming temperature. The foam products, according to the invention, presented good fire performance in German B2 test, Swiss and French M1 fire retardancy tests. To achieve that performance, very high amounts of HBCD (that is, high bromine percentage) for the comparative foam is required. The foams of the present invention also exhibited excellent dimensional stability and mechanical properties as do the comparative foams. However, the foams of the present invention exhibited good mechanical properties despite having a lower density. Therefore, the foams of the present invention are suitable for use in insulation applications and building construction.

What is claimed is:

1. A flame retardant foamed polymer composition comprising:
   a) a styrene polymer which is polystyrene or a copolymer of styrene monomer and copolymerizable ethylenically unsaturated comonomer(s) selected from the group consisting essentially of α-methylstyrene, acrylonitrile, acrylic or methacrylic acids having one to eight carbon atoms, esters of acrylic or methacrylic acid with alcohols having one to eight carbon atoms, fumeric esters having one to eight carbon atoms, maleic anhydride and a small amount of divinylbenzene, and
   b) a fire retardant formulation comprising:
      1) hexabromocyclododecane in an amount less than about 2.5% by weight based on 100% of styrene polymer and
      2) a phosphorous compound in an amount from about 0.1% to about 4.0% by weight based on 100% of styrene polymer wherein the phosphorous compound is selected frown 1) phosphates selected from triphenylphosphate, tributylphosphate, triethylphosphate, trimethylphosphate, tripropylphosphate, trioctylphosphate, diphenyl methylphosphate, tris-(2-ethylhexyl)phosphate, isodecyl diphenylphosphate, isooctyl diphenylphosphate, bisphenyl diphenylphosphate, trixylyl phosphate or triisopropylphenylphenylphosphate; 2) phosphonates of the formula $(RO)_2RPO$; 3) phosphinates of the formula $(RO)R_2PO$; 4) phosphine oxides of the formula $R_3PO$; 5) phosphines of the formula $R_3P$; and 6) phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion.

2. The polymer composition of claim 1 further including a flow promoter.

3. The polymer composition of claim 2 wherein the flow promoter is selected from dimethyldiphenylbutane, dicumyl peroxide or α,α'-bis-tert-butylperoxydiisopropylbenzene.

4. The polymer composition of claim 3 wherein the flow promoter is dimethyldiphenylbutane.

5. The polymer composition of claim 1 wherein the phosphate is triphenylphosphate.

6. The polymer composition of claim 1 wherein the hexabromocyclododecane is present in an amount less than about 2.0% by weight based on 100% of styrene polymer.

7. The polymer composition of claim 6 wherein the phosphorous compound is present in an amount of from about 0.5% to about 2.0% by weight based on 100% of styrene polymer.

8. The polymer composition of claim 7 wherein a flow promoter is present in an amount of from about 0.01% to about 0.2% by weight based on 100% of styrene polymer.

9. The polymer composition of claim 8 wherein the flow promoter is present in an amount of from about 0.02% to about 0.1% by weight based on 100% of styrene polymer.

10. The polymer composition of claim 1 wherein the hexabromocyclododecane is present in an amount of from about 1.0% to about 1.6% by weight on 100% of styrene polymer.

11. The polymer composition of claim 10 wherein the phosphorous compound is present in an amount of from about 1.0% to about 2.0% by weight based on 100% of styrene polymer.

12. The polymer composition according to any one of the preceding claims wherein the polymer composition has a closed-cell content of at least 90 percent according to ASTM D-2856.

13. A foamable gel for making a flame retardant foamed composition comprising:
   a) a styrene polymer which is polystyrene or a copolymer of styrene monomer and copolymerizable ethylenically unsaturated comonomer(s) selected from the group consisting essentially of α-methylstyrene, acrylonitrile, acrylic or methacrylic acids having one to eight carbon atoms, esters of acrylic or methacrylic acid with alcohols having one to eight carbon atoms, fumeric esters having one to eight carbon atoms, maleic anhydride and a small amount of divinylbenzene,
   b) a fire retardant formulation comprising:
      1) hexabromocyclododecane in an amount less than about 2.5% by weight based on 100% of styrene polymer and
      2) a phosphorous compound in an amount from about 0.1% to about 4.0% by weight based on 100% of styrene polymer wherein the phosphorous compound is selected from 1) phosphates selected from triphenylphosphate, tributylphosphate, triethylphosphate, trimethylphosphate, tripropylphosphate, trioctylphosphate, diphenyl methylphosphate, tris-(2-ethylhexyl)phosphate, isodecyl diphenylphosphate, isooctyl diphenylphosphate, bisphenyl diphenylphosphate, trixylyl phosphate or triisopropylphenylphenylphosphate; 2) phosphonates of the formula $(RO)_2RPO$; 3) phosphinates of the formula $(RO)R_2PO$; 4) phosphine oxides of the formula $R_3PO$; 5) phosphines of the formula $R_3P$; and 6) phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion; and
   c) a blowing agent.

14. The foamable gel of claim 13 wherein the blowing agent is a blowing agent mixture comprising up to 50% water.

15. The foamable gel of claims 13 or 14 wherein the blowing agent is a blowing agent mixture comprising up to 80% HFC-134a (1,1,1-2-tetrafluoroethane).

16. The foamable gel of claim 13 wherein the foamable gel further comprises a flow promoter.

17. A method for improving the fire resistance of a flame retardant foamed polymer having less than 2.5% by weight hexabromocyclododecane comprising combining a) a styrene polymer which is polystyrene or a copolymer of styrene monomer and copolymerizable ethylenically unsaturated comonomer(s) selected from the group consisting essentially of α-methylstyrene, acrylonitrile, acrylic or methacrylic acids having one to eight carbon atoms, esters of acrylic or methacrylic acid with alcohols having one to eight carbon atoms, fumeric esters having one to eight carbon atoms, maleic anhydride and a small amount of divinylbenzene with b) hexabromocyclododecane in an amount less than about 2.5% by weight based on 100% of styrene polymer and c) a phosphorous compound compound in an amount from about 0.1% to about 4.0% by weight based on 100% of styrene polymer wherein the phosphorous compound is selected from 1) phosphates selected from triphenylphosphate, tributylphosphate, triethylphosphate, trimethylphosphate, tripropylphosphate, trioctylphosphate, diphenyl methylphosphate, tris-(2-ethylhexyl)phosphate, isodecyl diphenylphosphate, isooctyl diphenylphosphate, bisphenyl diphenylphosphate, trixylyl phosphate or triisopropylphenylphenylphosphate; 2) phosphonates of the formula $(RO)_2RPO$; 3) phosphinates of the formula $(RO)R_2PO$; 4) phosphine oxides of the formula $R_3PO$; 5) phosphines of the formula $R_3P$; and 6) phosphonium salts of the formula $R_4PX$, wherein each R is independently selected from substituted or unsubstituted, saturated or unsaturated, branched or straight-chain aliphatic moieties or substituted or unsubstituted aromatic moieties and X is a suitable counter ion.

18. The method of claim 17 wherein the phosphorous compound is triphenylphosphate.

19. The method of claim 18 wherein the styrene polymer is further combined with a flow promoter.

20. The method of claim 17 wherein the styrene polymer is further combined with a blowing agent to form a foamable gel and the method further comprises expanding the foamable gel.

\* \* \* \* \*